3,105,856
PRODUCTION OF LIQUID POLYMERS OF
CONTROLLED VISCOSITY
Willie W. Crouch, Bartlesville, Okla., assignor to Phillips Petroleum Company, a corporation of Delaware
Filed Dec. 27, 1951, Ser. No. 263,534
8 Claims. (Cl. 260—680)

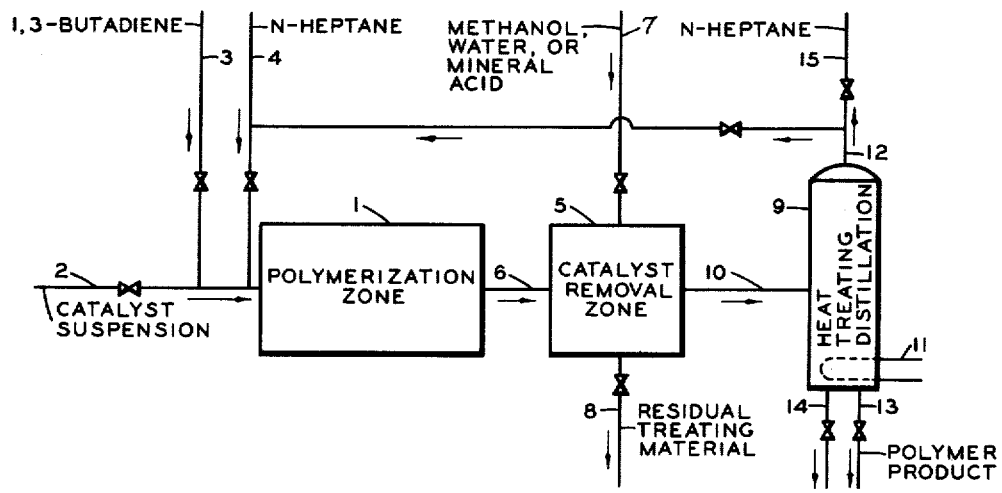

This invention relates to a method for producing liquid polymers of open chain conjugated monomeric dienes. In one preferred embodiment this invention relates to an improved method for producing liquid polymers of conjugated diolefins of controlled viscosity, which liquid polymers are free from dissolved or suspended solid polymers.

Various methods have been proposed for the polymerization of conjugated dienes to form liquid polymers. In one such method, the polymer can be prepared by solution polymerization in the presence of a finely divided alkali metal catalyst and a hydrocarbons, as described in copending application, Serial No. 67,098, filed December 23, 1948, now U.S. Patent No. 2,631,175. In accordance with another method, the liquid polymer can be prepared by aqueous emulsion polymerization in the presence of relatively large amounts of mercaptan modifiers. In accordance with still another method, the liquid polymer can be produced in the presence of hydrofluoric acid as a catalyst. However, in the preparation of such liquid polymers I have found that the viscosity of the final product is not reproducible to a constant degree. I have found that, for reasons not clearly understood, the viscosity of the final liquid polymer product varies over an undesirably broad range, even though the selected polymerization conditions are substantially identical. In other words, while the viscosity of the liquid polymer product can be governed to a certain extent by the polymerization conditions employed, there are frequently undesirably wide variations in viscosity of the product from runs that have been made under substantially the same conditions. It is highly desirable that a method be found for the production of liquid polydienes having a viscosity which can be controlled within relatively narrow limits, i.e. for the production of a liquid polydiene having a predetermined viscosity.

My invention is concerned with the poduction of liquid polymers of conjugated dienes, and for a greatly improved control of the polymer product viscosity.

An object of my invention is to provide a process for the production of liquid polymers of conjugated dienes. Another object is to provide for production of a liquid polymer of predetermined viscosity from a conjugated diene. Still another object is to provide for the polymerization of a conjugated hydrocarbon diene to produce a liquid polymer of a conjugated diene free from solid polymers, and for an improved control of the viscosity of the polymer product. Still another object is to provide for a liquid polymer product of an alkali metal catalyzed polymerization of 1,3-butadiene, having a predetermined controlled viscosity. Other objects will be apparent in the light of the accompanying discussion and disclosure.

In accordance with my invention, a liquid polymer of a conjugated diene is produced by effecting polymerization of a conjugated diene under conditions that will yield a liquid polymer and having a viscosity lower than a desired and predetermined viscosity; separating the polymer produced, from the polymer-containing reaction mixture; and then heating the isolated polymer under controlled temperature and time conditions to increase its viscosity to the desired predetermined level. The process of this invention provides for preparation of a polymer to a narrow viscosity specification not possible heretofore and eliminates the necessity for blending polymers of known viscosity with the ordinary polymer product in proportions to produce a product having the requisite viscosity specifications. This invention is based on my discovery that by so heating the isolated polymer, an accompanying viscosity increase occurs at such a relatively low rate that the predetermined desired viscosity level can be accurately reached at a given temperature by simple regulation of the time element. This behavior of a liquid polymer of a conjugated diene, of this kind, when heated, is surprising inasmuch as rubbery polymers tend to become degraded when heated under the conditions of my process.

The thermal treatment applied to the isolated polymer, in accordance with my invention is preferably conducted at a temperature within the range of from 200 to 400° F., for a period of time requisite for causing an increase in the viscosity to take place to the desired and predetermined level, generally from about 30 minutes to 10 hours, as illustrated by the data of Example I.

My invention, although applicable to liquid polymers made in any manner, e.g. by mass polymerization, in aqueous emulsion, or in the presence of other catalysts such as hydrogen fluoride, is particularly well applied to the production of liquid polymers which have been produced by mass polymerization in the presence of an alkali metal catalyst, e.g. one produced in accordance with the process of my copending application, Serial No. 67,098, already referred to hereinabove.

In accordance with the process of the last mentioned copending application the preparation of the liquid polymer in a preferred modification comprises the steps, (1) removal of 1,2-butadiene and other deleterious materials from the 1,3-butadiene feed stock; (2) polymerization of the 1,3-butadiene obtained from the first step in the presence of an alkali metal catalyst and a suitable diluent, the reaction being carried out under carefully controlled reaction conditions, particularly temperature, catalyst condition and concentration, quantity of solvent, and rate of butadiene addition; (3) recovery of the product by some appropriate means such as by treatment with a small quantity of water followed by introduction of carbon dioxide to react with the alkali metal and organo-alkali metal compounds and precipitate alkali metal carbonates, removal of the precipitate, and stripping to separate the diluent from the liquid polymer.

When conducting the polymerization in this manner, a polymer of low molecular weight is produced, and the formation of high molecular weight compounds is excluded. The polybutadiene thus produced is a substantially colorless, transparent liquid which is free from dissolved or suspended solid polymeric material. The viscosity of the polybutadiene product as measured at 100° F. is below 10,000 Saybolt Furol seconds.

In the first step, butadiene feed stock is preferably prepared in a purity of 98 percent with a maximum of 2 percent of non-paraffinic impurities. The impurities such as 1,2-butadiene, olefins, acetylenes and oxygenated compounds can be removed by fractionation, and the purified feed stock dried.

The second step comprises polymerization of the 1,3-butadiene obtained from the first step, in the presence of a finely divided alkali metal catalyst and a suitable diluent such as benzene, heptane, and the like, the reaction being carried out under carefully controlled reaction conditions. Care is taken to exclude oxygen from the reaction mixture.

Generally, when carrying out the second step of the polymer preparation procedure, a solvent such as benzene is charged to a reactor, equipped with a stirrer or other means for providing agitation, along with the finely divided alkali metal catalyst, generally sodium or potassium, suspended in a suitable dispersing medium such as benzene, toluene, xylene and the like. The mixture is heated to the desired temperature, i.e., from 60 to 110° C. after which a portion of the 1,3-butadiene is introduced, for example, in an amount such that the concentration of 1,3-butadiene in the solvent is in the range of from 0.03 to 0.15 pound per pound of solvent. The reaction mixture is held at a constant temperature and stirred until the reaction is initiated, as evidenced by an increase in temperature and a drop in pressure. Time usually required for the initiation period is in the range of 5 to 30 minutes. After the reaction has started, additional 1,3-butadiene is charged at a rate ranging from 0.03 to 0.4 pound of the diolefin per hour per pound of solvent. Addition of butadiene is continued until the concentration of polymer in the reaction mixture reaches the desired level. After flow of diolefin is stopped, agitation of the reaction mixture is continued until the reaction is substantially complete as evidenced by a drop in pressure in the reactor to the vapor presure of the solvent-polymer solution at the operating temperature.

The preparation of the alkali metal catalyst involves charging a dispersion medium such as xylene to a reaction vessel wherein it is heated to a temperature above the melting point of the alkali metal, as 100 to 115° C. in the case of sodium, in a dry oxygen-free atmosphere, after which the freshly cut alkali metal is added. The temperature is adjusted to about 110° C. and the mixture vigorously agitated, for a period usually ranging from 5 to 15 minutes or until a stable dispersion is produced. The system is allowed to cool to about 100° C. when agitation is stopped. The catalyst dispersion usually contains about 5 to 35 weight percent metal, based on the dispersion medium employed. Catalyst thus prepared is ready for use in the polymer preparative method above discussed.

To obtain a polymer of low viscosity, it is essential that the catalyst be finely dispersed. It is essential that the average particle size of the catalyst be below 200 microns and desirable that it be below 100 microns. It is frequently preferred that the average particle size of the catalyst be within the range of 40 to 80 microns. As the particle size of the catalyst is increased, polymers of higher viscosity are obtained.

In general, the time required to carry out the polymerization step is exclusive of the initial introduction period, does not exceed eight hours and it is preferably below four hours.

The average molecular weight of the hydrocarbon polymer of the preparative method discussed herein, will generally vary from 1000 to 3000. It has a viscosity below 10,000 Saybolt Furol seconds as measured at 100° F. The liquid product is comprised in its entirety of low molecular weight material, i.e., it is free from dissolved or suspended solid polymers.

The double bonds in the polymer thus prepared are of such a nature that they do not react completely under conditions ordinarily used for iodine number determinations and therefore this method for determining unsaturation is not reliable. However, the unsaturation has been determined by an iodine monochloride method which gives more significant results. For example, if a molecular weight of 2000 is assumed, the unsaturation has been found to be in the neighborhood of about 30 double bonds per molecule. This is equivalent to an iodine number of about 371. Stated in a different way, the product on this basis is calculated to contain 0.79 double bond per butadiene unit, if the product is liquid polybutadiene.

While the preparative method above discussed has been described in terms of the production of liquid polybutadiene, it is also applicable to other polymerizations in which 1,3-butadiene is the major ingredient. For example, it is applicable to the polymerization of 1,3-butadiene with materials copolymerizable therewith, and such materials include other conjugated diolefins such as isoprene, piperylene, 2,3-dimethylbutadiene, and the like, and vinyl compounds such as styrene, methyl substituted styrenes, etc. In all such polymerizations the major polymerizable ingredient is a conjugated diene and this component is present in an amount which exceeds 50 weight percent of the monomeric material.

In a preferred embodiment of my invention a monomeric conjugated diolefin is polymerized in accordance with the sodium catalyzed polymerization method discussed hereinabove with reference to the last said copending application, in the presence of a solvent such as a paraffinic hydrocarbon, or mixture of such hydrocarbons, particularly a normally liquid paraffin such as a pentane, hexane, heptane, and certain naphtha fractions, preferably having not over ten carbon atoms per molecule; cycloparaffins such as cyclohexane; and aromatic hydrocarbons such as benzene, toluene, or low molecular weight alkyl benzenes; under time conditions dependent upon the selected polymerization temperature level, the amount of catalyst, the particle size of the catalyst, and the like, so as to form a liquid polymer product having a viscosity below that desired for the final polymer product. Effluent from the polymerization step is then passed to a product separation zone, as for example a washing zone wherein the alkali metal catalyst is washed free from the polymerization reaction mixture, followed by distillation of the solvent therefrom while heating to produce the residual isolated polymer product. The residual product is then further heated until its viscosity reaches the desired predetermined level, the heating time, dependent on the temperature conditions selected often being generally from about 30 minutes to 10 hours.

In order to present my invention more clearly, reference is made to the attached drawing exemplary of one of the preferred embodiments of my invention. It is to be understood that the drawing is diagrammatic and that various modifications can be made and still be within the intended scope of this invention. Referring to the FIGURE, a dispersion of an alkali metal catalyst, as for example, a finely divided suspension of sodium in xylene not exceeding 2.0 parts by weight of sodium per 100 parts by weight of diolefin to be charged, is introduced via line 2 into polymerization zone 1 together with a conjugated diolefin reactant, preferably 1,3-butadiene, charged to zone 1 via line 3 and with a selected solvent for the reaction of the type discussed above, preferably normal heptane via line 4. The average particle size of the metal catalyst is below 200 microns and preferably below 100 microns. An amount of solvent is charged to zone 1 such that the percent polymer in the final mixture does not exceed 50 weight percent, and is usually in the range of 25 to 40 percent. Zone 1 is maintained at a polymerization temperature within the preferred range of from 60 to 110° C. In carrying out the alkali catalyzed polymerization of 1,3-butadiene in zone 1, the reaction mixture is held at a constant temperature and stirred until the reaction is initiated as evidenced by an increase in temperature and a drop in pressure, the time usually required for the initiation being from 5 to 30 minutes. Following initiation of the reaction, additional 1,3-butadiene is charged, the maximum rate of addition depending upon the ability to control the reaction temperature, i.e. to remove the heat of reaction from the reactor. The addition of conjugated diolefin is continued, preferably at a constant rate. Total effluents from polymerization zone 1 are discharged via line 6 to catalyst removal zone 5. Separation of catalyst from the reaction mixture in zone 5, can be carried out in any desired manner. In one embodiment, the catalyst-containing mixture in zone 5 is contacted with a treating material such as water, methanol, mineral acid, such as dilute sulfuric acid, or the like, introduced into zone 5 via line 7, whereby the catalyst is "destroyed." If desired, a mixture of one or all of these treating materials can be employed, i.e., at least one of the group of water, alcohol and a mineral acid. Residual treating material, comprising any unreacted treating agent, i.e., water, alcohol, or acid, and product of reaction of the treating material with alkali-metal catalyst and any organo-alkali metal compounds in the polymer, is discharged from zone 5 via line 8. The residual polymer mixture, free from catalyst, is discharged from zone 5 via line 10 and then introduced into distillation and heat treating zone 9 equipped with heating means 11, as for example a steam coil. The solvent-polymer mixture in zone 9 is then heated, preferably under atmospheric pressure conditions for distilling the solvent as an overhead distillation product from zone 9, withdrawn via line 12. Solvent in line 12 can be recycled to line 4 for reuse in polymerization zone 1, if desired, or can be withdrawn directly from the system via line 15. The residual polymer in zone 9 is further heated under time-temperature conditions such as already described, as a result of which the viscosity of the polymer being heated is gradually increased. Heating in this manner is conducted until the predetermined and desired viscosity level is attained. In order to arrive at the optimum time under the selected temperature conditions, samples of the heated polymer are removed from time to time from zone 9 via line 14 and their viscosity determined. Upon attaining the desired viscosity level, the polymer product is withdrawn from zone 9 via line 13.

In conducting the polymerization in zone 1, illustrated with reference to the drawings, the viscosity of the polymer product sometimes reaches or approaches 500 Saybolt Furol seconds as measured at 100° F. and in such instances the process of this invention is applicable only to the production of polymers having a final viscosity above 500 SFS at 100° F. However, it is to be understood that in instances where the polymer product has a viscosity somewhat lower than 500 SFS at 100° F., the present invention is applicable to that polymer product in the production of polymers having a viscosity below 500 SFS at 100° F., but higher than that obtained in the polymerization step.

My invention is also applied to halogen-containing liquid polymers of conjugated monomeric dienes such as chloroprene, bromoprene, and the like. These polymers, although not produced by polymerization of the corresponding conjugated diene in the presence of an alkali metal catalyst, are produced in accordance with other methods, as for example by aqueous emulsion polymerization.

In cases where it is desired, air can be bubbled through the residual liquid polymer during the heating step, i.e., during the time that the polymer is being heated to increase its viscosity to the desired predetermined level. When air is bubbled through the polymer in this manner, the requisite heating time is shortened. Instead of air, peroxide compounds such as benzoyl peroxide, cumene hydroperoxide, and various hydroperoxides frequently designated as Dioxes can be employed.

My invention is illustrated by the following examples. The reactants, their proportions, and other specific ingredients are presented as being typical and should not be construed to limit the invention unduly.

*Example I*

Data in the following tabulation are illustrative of the rate of the viscosity increase of liquid polybutadiene, free from solids, that take place when the free polymer is heated. The liquid polybutadiene in each case was a product of polymerization of 1,3-butadiene conducted in accordance with the polymerization discussed in some detail with reference to the drawings. In carrying out these runs, samples of the liquid polybutadiene were blanketed with nitrogen and heated under different time-temperature conditions, varied as indicated, to give products of varying viscosity. The corresponding changes in viscosity in response to time at specific temperature levels, are demonstrated. Heating was done in an oil bath.

| Bath Temperature, °/F. | Time, Hours | Viscosity, SFS at 100° F. |
|---|---|---|
| 250 | Original Viscosity | 1,647 |
| 250 | 1 @ 250° F. | 1,689 |
| 250 | 2.5 | 1,679 |
| 250 | 4 | 1,813 |
| 250 | 6 | 1,819 |
| 250 | 8 | 1,858 |
| 275 | 40 Min. to reach 275° F. | 1,707 |
| 275 | 1 @ 275° F. | 1,733 |
| 275 | 2.5 | 1,770 |
| 275 | 4 | 1,856 |
| 275 | 6 | 1,936 |
| 275 | 8 | 2,023 |
| 300 | 40 Min. to reach 300° F. | 1,763 |
| 300 | 1 @ 300° F. | 1,870 |
| 300 | 2.5 | 1,943 |
| 300 | 4.5 | 2,062 |
| 300 | 7 | 2,197 |
| 325 | 40 Min. to reach 320° F. | 1,782 |
| 325 | 1 @ 325° F. | 1,923 |
| 325 | 3 | 2,307 |
| 325 | 7 | 2,806 |

*Example II*

In the following tabulation is illustrated the accelerating effect of the presence of oxygen (as air) in contact with a liquid polybutadiene being heated, the rate of viscosity change being greatly accelerated in the presence of oxygen. The liquid polymer was free from solids and was prepared by the alkali-metal catalyzed polymerization of 1,3-butadiene. Heating was done in an oil bath.

| Bath Temperature, ° F. | Conditions of Heating | Time, Hours | Viscosity SFS at 100 °F. |
|---|---|---|---|
| 300 | Under nitrogen | 40 min. to reach 290° F. | 2,866 |
| 300 | do | 2 @ 294° F. | 3,501 |
| 300 | do | 5 | 4,729 |
| 300 | do | 8 | 5,524 |

| Flask Temperature, ° F. | Conditions of Heating | Time, Hours | Viscosity, SFS at 100° F. |
|---|---|---|---|
| 294 | Air bubbled in during heating period. | 40 min. to reach 290° F. | 3,489 |
| 294 | | 2 @ 294° F. | 5,233 |
| 294 | | 5 | 8,792 |

*Example III*

1,3-butadiene was polymerized in each of a series of 8 runs under very similar conditions, in some of the runs the conditions being substantially identical. Each run was made in a 5-gallon reactor in the presence of sodium as a catalyst and employing n-heptane as a solvent, in accordance with the polymerization process described with reference to the drawings. In each of these runs the total charge was as follows:

Butadiene _____ lbs__ 12
Sodium catalyst, in xylene [1] _____ cc__ 467
n-Heptane _____ lb__ 18

[1] The amount of sodium catalyst used was 1.25 percent, based on the butadiene. The catalyst was prepared as a 15 percent dispersion of sodium in xylene.

In each case the temperature was 205° F. and the final concentration of the polymer in the n-heptane was 40 percent. The final pressure in each case was zero thus indicating that polymerization was substantially complete. The results are shown below:

| Run Number | Reaction Time | | Butadiene feed rate, lbs./hr. | Viscosity, SFS at 100° F. |
|---|---|---|---|---|
| | Hrs. | Mins. | | |
| 1 | 2 | 18 | 6 | 468 |
| 2 | 2 | 28 | 5.5 | 426 |
| 3 | 2 | 10 | 6 | 446 |
| 4 | 2 | 10 | 8 | 395 |
| 5 | 2 | 24 | 5.7 | 375 |
| 6 | 2 | 16 | 5.6 | 495 |
| 7 | 2 | 15 | 5.6 | 328 |
| 8 | 2 | 16 | 5.7 | 417 |

The data of Example III demonstrate the degree to which the viscosity of the polymer product can be reproduced, when employing controlled polymerization conditions, but not employing the heat treating step of this invention. Particularly illustrative of the variations that are encountered in the viscosity of the product of runs made under substantially identical conditions, are the data associated with runs 6, 7, 8, with runs 2 and 5, and with runs 3 and 4.

Variation and modification are possible within the scope of the foregoing disclosure and the appended claims to the invention the essence of which is a method providing for a greatly improved control of polymer product viscosity, in the preparation of a liquid polymer of a conjugated diene, which method comprises the steps of first effecting polymerization of the conjugated diene under conditions yielding a liquid polymer having a viscosity lower than a desired and predetermined viscosity, separating the polymer product from the polymer-containing reaction mixture, and then heating the isolated polymer under controlled temperature and time conditions as set forth herein to increase its viscosity to the desired predetermined level.

I claim:

1. A process for the production of a liquid polybutadiene free from solid polymers and having a predetermined viscosity, which comprises adding 1,3-butadiene to a stable dispersion of finely divided alkali metal catalyst having an average particle size of less than 200 microns in a body of liquid hydrocarbon solvent in a closed reaction vessel, said catalyst not exceeding 2.0 parts by weight per 100 parts total butadiene charged, maintaining the resulting reaction mixture at 60 to 110° C. while agitating same until polymerization of the butadiene is initiated, then charging additional butadiene feed to the reaction mixture while agitating same and maintaining same at 60 to 110° C., said additional butadiene being added at a rate without causing the reaction mixture temperature to rise above 60 to 110° C. for a period during which a polybutadiene reaction mixture is formed containing polybutadiene having a viscosity below said predetermined viscosity and containing not in excess of 50 weight percent of said polybutadiene, deactivating alkali metal in the resulting polybutadiene-containing solution and recovering an alkali metal-free solution of polybutadiene in said solvent, heating the resulting alkali metal-free solution under distillation conditions to remove solvent therefrom as distillate and further heating the residual alkali metal-free solvent-free polybutadiene in the absence of oxygen thereby increasing its viscosity and continuing the last said heating until a viscosity of said residual polybutadiene increases to become said predetermined viscosity, and recovering liquid polybutadiene having said predetermined viscosity as a product of the process.

2. A process of claim 1 wherein said alkali metal is deactivated by washing said solution with at least one treating material reactive with said alkali metal and selected from the group consisting of water, alcohol, and an inorganic mineral acid.

3. A process of claim 1 wherein said alkali metal is sodium.

4. In a process for the treatment of a polymer produced by solution polymerization of a monomeric material comprising 1,3-butadiene in the presence of sodium as the catalyst and in which a resulting liquid polymer is obtained, the improvement which comprises treating said liquid polymer in the absence of said catalyst for a period of 30 minutes to 10 hours at a temperature of 200 to 400° F. in the absence of oxygen.

5. In a process for the treatment of a polymer produced by solution polymerization of a monomeric material comprising 1,3-butadiene in the presence of an alkali metal as the polymerization catalyst and in which a resulting liquid polymer is obtained, the improvement which comprises removing said catalyst from said liquid polymer and thereafter increasing the inherent viscosity of said liquid polymer by heating same for a period of time in the absence of oxygen and recovering as the polymer product a liquid polymer.

6. A process for preparing a liquid polymer which comprises effecting polymerization of a monomeric material comprising 1,3-butadiene in the presence of an amount of a hydrocarbon diluent such that the polymer resulting from the process does not exceed 50 weight percent of the polymerization mixture, in the presence of up to 2.0 parts by weight per 100 parts of monomers of finely divided metallic sodium at a temperature between 60 and 110° C., product is obtained which has a viscosity somewhat less than the ultimately desired, stopping the polymerization by killing and removing the catalyst, and then heating said liquid polymer at a temperature between 200 and 400° F. in the absence of oxygen until a final liquid polymer having the desired viscosity is obtained.

7. A process of improving a polymer which comprises preparing a polymer of butadiene-1,3 with sodium as a catalyst in presence of a diluent to an intrinsic viscosity below that ultimately desired and then subsequently heating the polymer to a temperature between about 200° F. and about 400° F. in the absence of oxygen until the desired viscosity is obtained.

8. As a new composition of matter, a polymer of butadiene-1,3 which has been prepared by the use of sodium as a catalyst and synthesized to an intrinsic viscosity below that ultimately desired and then subsequently heated at a temperature between about 200° F. and about 400° F. in the absence of oxygen until the desired viscosity is obtained.

References Cited in the file of this patent

UNITED STATES PATENTS

| | | |
|---|---|---|
| 2,264,811 | Rothrock | Dec. 2, 1941 |
| 2,376,090 | Schulze et al. | May 15, 1945 |
| 2,506,857 | Crouch | May 9, 1950 |
| 2,513,244 | Gleason et al. | June 27, 1950 |
| 2,514,986 | Banes et al. | July 11, 1950 |
| 2,553,651 | Gessler | May 22, 1951 |
| 2,578,214 | West | Dec. 11, 1951 |
| 2,586,594 | Arundale | Feb. 19, 1952 |
| 2,603,655 | Strain | July 15, 1952 |
| 2,611,788 | Bloch | Sept. 23, 1952 |
| 2,672,425 | Gleason et al. | Mar. 16, 1954 |
| 2,683,162 | Gleason | July 6, 1954 |
| 2,701,780 | Nelson et al. | Feb. 8, 1955 |
| 2,753,385 | Gleason | July 3, 1956 |

UNITED STATES PATENT OFFICE
CERTIFICATE OF CORRECTION

Patent No. 3,105,856　　　　　　　　　　　　October 1, 1963

Willie W. Crouch

It is hereby certified that error appears in the above numbered patent requiring correction and that the said Letters Patent should read as corrected below.

Column 8, line 33, after "110° C.," insert -- whereby a liquid --.

Signed and sealed this 14th day of April 1964.

(SEAL)
Attest:
ERNEST W. SWIDER

Attesting Officer

EDWARD J. BRENNER

Commissioner of Patents